(No Model.)
H. C. SPALDING.
ANTI INDUCTION CABLE.
No. 327,486. Patented Sept. 29, 1885.
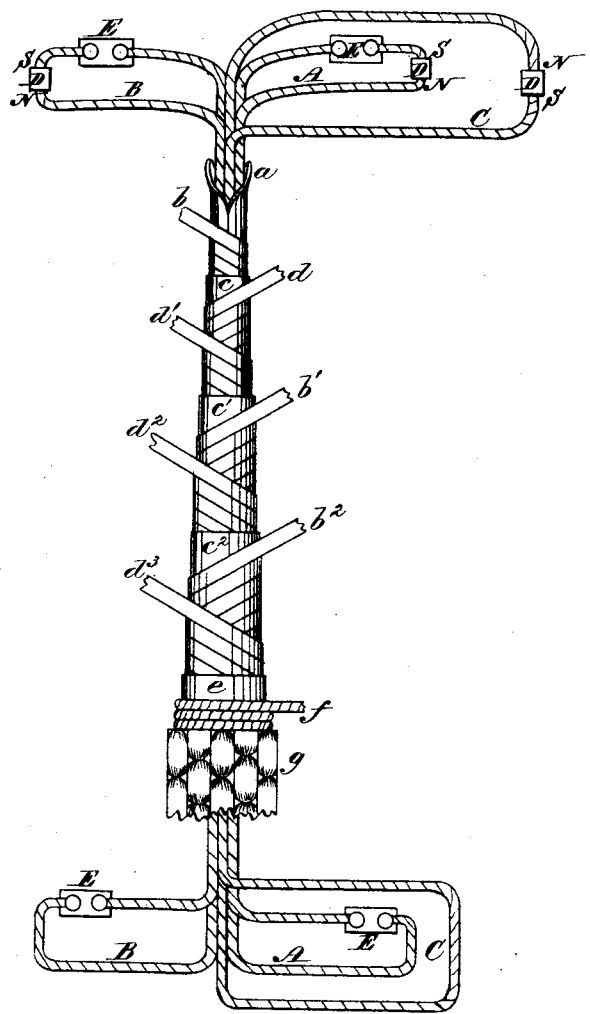
WITNESSES
W. Frisby
Raymond F. Barnes
INVENTOR
Henry C. Spalding
By Parker W. Page
atty

United States Patent Office.

HENRY C. SPALDING, OF BOSTON, MASSACHUSETTS.

ANTI-INDUCTION CABLE.

SPECIFICATION forming part of Letters Patent No. 327,486, dated September 29, 1885.

Application filed February 24, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Anti-Induction Cables, of which the following is a specification, reference being had to the drawing accompanying and forming a part of the same.

My invention relates to electrical cables containing the conductors of two or more independent circuits; and it consists in improvements in the arrangement or disposition of the wires forming the said circuits, whereby rapid working is facilitated and freedom from the effects of induction and retardation secured.

The specific objects of my invention are—

First. To prevent induction between the wires of independent circuits, and this I accomplish by interposing between those wires through which currents pass in the same direction an insulated idle wire to serve as an induction-screen.

Second. To prevent the effects of retardation exercised by one current upon another. This I do by connecting up the idle wires in a complete circuit.

Third. To assist the transmission of electrical impulses and facilitate directly rapid working. This I have succeeded in doing by passing a continuous current through the idle wires in an opposite direction to that of the currents in the two wires adjacent thereto.

A cable embodying these features of novelty may be constructed in many ways—that is to say, any kind of insulation may be employed that answers in other cables, and the wires may be assembled either with or without a central core or an inclosing metallic sheath or sheaths. I have adopted for use, however, the insulation and the insulated sheaths described by me in other applications.

In the drawing I have shown the invention in its simplest form as applied to a cable insulated and protected by the means above referred to.

The figure exhibits my improved cable, a portion of each layer of the same being exposed and the circuit-connections being completed in diagram.

The cable in the present instance contains two active and one idle circuit. Should a greater number of circuits be used, the principle of arrangement here shown is to be followed; but in case a number of circuits are employed it may be desirable to use a central supporting-core about which the conductors are laid. This, however, I have made the subject of separate applications.

A and B are the wires or conductors of two independent round wire or metallic circuits. C is the wire of a third circuit. The wire C is interposed between the wires A and B in the manner shown—that is to say, the leading and return wires of each circuit run side by side, the circuit C being between the others.

In using the cable the batteries D are connected to the several circuits, and suitable transmitting and receiving instruments (represented by the conventional figures E) are included in the two working-circuits A and B.

The batteries are so connected to the lines that the current in each of the idle wires will be opposite in direction to that of the currents that pass in the active wires on either side of it, this direction of currents being indicated by the letters N S in the drawing.

The wires of the several circuits are insulated by spiral wrappings of fibrous material, preferably paper. When properly grouped in the relative positions described, they are inclosed in an envelope of a plastic material capable of being applied in two strips, $a\ a$, and compressed around the wires. The cable is further insulated and protected by a spirally-wound metal strip, $b$, a coating of resinous varnish, $c$, a spirally-wound paper strip, $d$, a second strip of paper, $d'$, and other layers of metal foil, $b'\ b^2$, resinous varnish $c'\ c^2$, and paper $d^2\ d^3$. Then is applied a viscous bituminous envelope, $e$, a serving of cord, $f$, and the protective armor $g$. This method of constructing and using the cable is productive of many advantages. Rapid working or telephoning without the usual drawbacks of interference from induction and retardation is rendered possible, which results I attribute to the disposition of the positive and negative wires of the several circuits, by which induction is lessened, to the presence of the idle wires forming complete circuits between wires in which the currents are flowing in the same direction, and to the flow of a continuous current in the idle wires in the opposite direction to those of the adjacent wires, by which the intermittent currents in the active wires are assisted, while reactive effect upon the intermittent currents from their inductive action upon the idle wires, where a current is already flowing, is less than would be the case had they to induce currents in a wire in which none was passing.

By inclosing the system of conductors in one or more insulated metal screens I protect them also from the earth's influence.

What I claim is—

1. The combination, with the active circuit-wires of an electric cable and means for transmitting intermittent impulses of current through the same, of idle wires through which a continuous current is made to flow in an opposite direction to that in the adjacent wires, as set forth.

2. In an electrical cable, the combination, with insulated conductors forming complete or round-wire working-circuits, of insulated idle conductors interposed between the working-circuits and connected in metallic circuit, as set forth.

3. In an electrical cable, the combination, with insulated conductors forming complete or round-wire working-circuits, of insulated idle wires interposed between the working-circuits and connected in metallic circuit, and batteries connected with said circuits in such order that the current passing in any idle wire shall be opposite in direction to the currents in the two adjoining working-wires, as set forth.

4. In an electrical cable, the combination, with a complete or round-wire active circuit or circuits, of a complete or round-wire induction-circuit, as set forth.

5. In an electrical cable, a metallic screen or screens surrounding complete or round-wire active or working and idle or induction circuits, as set forth.

In testimony whereof I have hereunto set my hand this 16th day of September, 1884.

HENRY C. SPALDING.

Witnesses:
CHARLES L. SIMMONS,
SANFORD H. DUDLEY.